(12) United States Patent
Klotz, Jr.

(10) Patent No.: US 7,057,752 B1
(45) Date of Patent: Jun. 6, 2006

(54) METHODS AND SYSTEMS FOR PROVIDING STATUS INFORMATION FOR REPROGRAPHIC OPERATIONS

(75) Inventor: Leigh L. Klotz, Jr., Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/459,901

(22) Filed: Dec. 14, 1999

(51) Int. Cl.
*H04N 1/00* (2006.01)

(52) U.S. Cl. .................. 358/1.15; 358/405; 358/440; 379/100.06

(58) Field of Classification Search .............. 358/1.15, 358/402, 405, 440, 441; 379/100.01, 100.06, 379/100.08, 100.16
See application file for complete search history.

(56) References Cited

U.S. PATENT DOCUMENTS

| 4,956,860 | A | * | 9/1990 | Murata | 358/440 |
| 5,140,439 | A | * | 8/1992 | Tanaka | 358/405 |
| 6,477,243 | B1 | * | 11/2002 | Choksi et al. | 379/100.06 |

FOREIGN PATENT DOCUMENTS

JP          4-337958         * 11/1992

OTHER PUBLICATIONS

MIT Driver for the ITS Operating System from 1977-1979.
Canon Canofax 270 Instruction Manual, p. 95 (1989).
Flowport™. Application Server Software (1999).
Reddy et al., "XCRIBL, A Hardcopy Scan Line Graphics System for Document Generation," Carnegie-Mellon University, Computer Science Department (1972).
Thomas et al., "U of T Library Pioneers Xerographic Catalogue Publishing," *Canadian Datasystems*, pp. 26-29 (1973).

* cited by examiner

*Primary Examiner*—Thomas D. Lee
(74) *Attorney, Agent, or Firm*—Finnegan, Henderson, Farabow, Garrett & Dunner LLP

(57) ABSTRACT

Systems and methods for providing status information corresponding to a reprographic operation are described. The disclosed systems and methods create an audio message to provide the status information to a voice mailbox, pager, or telephone number. The audio message may include any relevant information regarding a reprographic operation such as status of the operation, success or failure of the operation, a telephone number to which the document was transmitted, document scan time, and the number of pages processed. When a request for a reprographic operation is received, the system obtains information identifying a location to provide status information corresponding to the reprographic operation. After receiving the request for a reprographic operation, the system may monitor the reprographic operation and obtain status information corresponding to the reprographic operation. The system may identify a notification device, such as a voice mailbox or telephone number, using the information provided with the request for a reprographic operation to transmit the status information. The status information is then translated to an audio message and provided to the determined notification device.

16 Claims, 4 Drawing Sheets

METHODS AND SYSTEMS FOR PROVIDING STATUS INFORMATION FOR REPROGRAPHIC OPERATIONS

BACKGROUND OF THE INVENTION

A. Field of the Invention

The present invention relates generally to reprographic systems, and more particularly to systems for providing status of reprographic operations.

B. Description of the Related Art

An increasing trend in reprographic devices such as facsimile machines is to increase their memory and improve their scanning speed to reduce operator time. However, users often wait for the completion of reprographic operations such as for the resulting confirmation sheet to ensure that the operation was completed successfully. For example, facsimile machines print confirmation sheets with information on the status of facsimile transmissions. The purpose of such sheets is to provide users with confidence that their documents have been transmitted. However, users must wait for the machine to (i) scan the input document, (ii) store the resulting image in memory, and (iii) complete an attempt to transmit the image before learning whether the operation completed successfully. Because users wait near or in close proximity to the facsimile machine for a confirmation sheet any benefit to the user stemming from increased memory and/or improved scanner time is negated.

Moreover, confirmation sheets, the user interface mechanism to report on reprographic operation status, suffer from several disadvantages. They are often poorly designed, and subject to constraints on layout and font formatting. It is often difficult to determine from the confirmation sheet whether a facsimile transmission succeeded. They are always printed out at the sending machine, usually long after the user has left the machine, and so they perform no useful function. Furthermore, the sheets are kept in a public location and are subject to access or disposal by someone other than the server.

A need therefore exists for a mechanism that provides useful, timely information on the status on operations of reprographic devices such as facsimile machines and networked scanners.

SUMMARY OF THE INVENTION

Accordingly, the present invention is directed to a confirmation system for reprographic operations that substantially obviates one or more of the problems due to limitations and disadvantages of the related art.

In accordance with the purpose of the invention, as embodied and broadly described, systems and methods consistent with the present invention monitor reprographic operations by receiving a request for a reprographic operation that includes information identifying a location to provide status information corresponding to the reprographic operation, receiving the status information corresponding to the reprographic operation, generating an audio message reflecting the status information, and transmitting the audio message using the location information. The audio message may include voice data or other audible signals. The location information may identify a telephone number, pager, or voice mailbox associated with a requester and/or other entity interested in the status of the requested reprographic operation. The status may include information about the success or failure of transmission, transmission destination, meta-information about the document and its destination, and the state of other operations performed. The meta-information may include information determined from document contents or additional data entered at the time of a reprographic operation.

It is to be understood that both the foregoing general description and the following detailed description are exemplary and explanatory only and are not restrictive of the invention, as claimed.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Systems and methods consistent with the principles of the invention overcome one or more of the problems due to limitations and disadvantages of the related art by providing an audio message, such as a voice message or other audible data, to a designated voice mailbox or telephone number associated with each reprographic operation. The audio message may include any information relevant to the reprographic operation such as operation status, success or failure of the operation, fax number or other transmisstion destination, document scan time, number of pages, and meta-information about the document determined at scan time or during subsequent processing. The audio message may be used in addition to or instead of current confirmation methods such as confirmation sheets for facsimile machines. By providing an audio message reflecting information regarding a reprographic operation, user confidence in reprographic operations increases. User confidence may be increased further by enabling the user to re-perform a reprographic operation in a remote location upon receiving an audio message of the original operation. Since the user may obtain status information regarding a reprographic operation at a desired telephone, pager, or voice mailbox account, the user is more likely to leave the reprographic device and perform other tasks during a reprographic operation. Systems and methods consistent with the present invention are particularly suited for lengthy reprographic operations; however, they are not limited to such operations.

The above-noted features and other aspects and principles of the present invention may be implemented in various system or network environments to provide automated computational tools to facilitate monitoring of a reprographic operation. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

Figure 1:
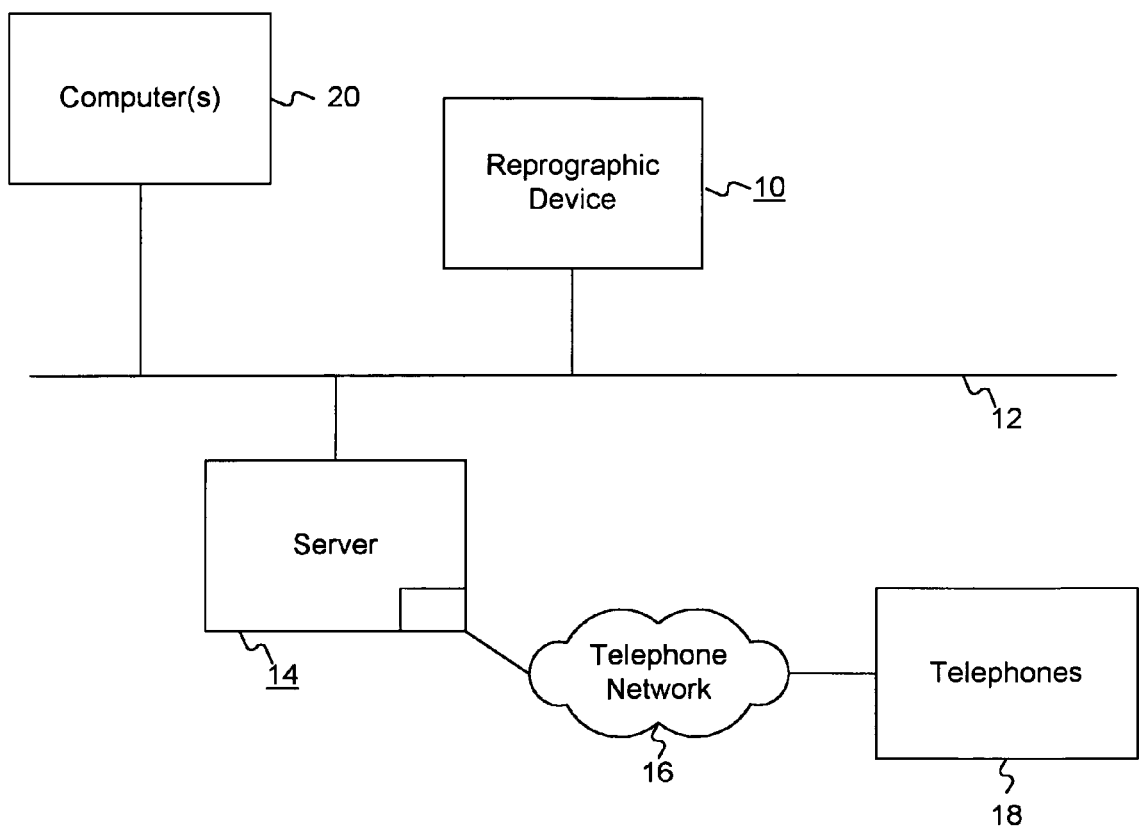
FIG. 1 is a schematic view of a system environment in which systems and methods consistent with the present invention may be implemented.

As embodied herein, a method for monitoring reprographic operations includes receiving a request for a reprographic operation including information identifying a location to provide information corresponding to the reprographic operation. FIG. 1 illustrates a non-limiting example of a system environment in which systems and methods consistent with the present invention may be implemented. As shown in FIG. 1, a system environment may include a reprographic device 10; a data network 12 such as a local area network, a wide area network, or the Internet; one or more computers 20; a server 14; and one or more telephones 18 that may be accessed through a telephone network 16. Reprographic device 10 receives requests for reprographic operations such as sending or printing documents. Status information on these operations is provided to server 14, which generates audio messages corresponding to the status information and transmits those audio messages to telephones 18. Those skilled in the art will appreciate that telephones 18 are representative of any device capable of providing audio messages to users. For example, telephones 18 also represents voice mailboxes or pagers configured to receive audio messages. In this configuration, users access their voice mailboxes using telephones or other access devices such as computers 20 with audio output capability (e.g., sound cards and speakers). Computers 20 may also be used to communicate with reprographic device 10. For example, a user may wish to instruct device 10 to repeat an operation such as when a user receives an audio message indicating that a reprographic operation was not successfully completed. The telephone network 16 is not limited to any particular configuration. It may be a public-switch telephone network (PSTN), a private branch exchange (PBX), an intranet private branch exchange (IPBX), or a dedicated network, for example. Telephone network 16 routes the message to telephone 18, which was determined by server 14 from the location information provided by the user. The message may be sent directly to voice mail or to a human.

Figure 2:
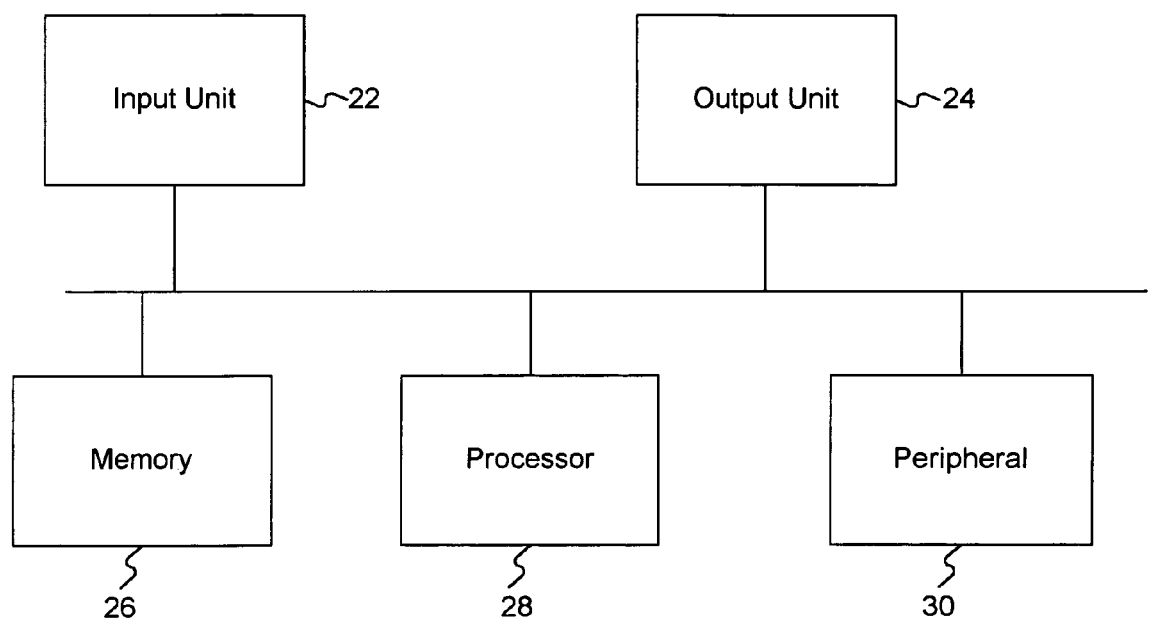
FIG. 2 is a schematic view of a reprographic device consistent with the present invention.

Reprographic device 10, which receives the request for a reprographic operation, is schematically illustrated in FIG. 2. Reprographic device 10 may include an input unit 22, an output unit 24, a memory 26, a processor 28, and a peripheral 30. Input unit 22 may receive a request for a reprographic operation including information identifying a location to provide information corresponding to the reprographic operation. In one embodiment, the user may use an identification mechanism such as an account number, identification card, or paper user interface when requesting the operation. The identification mechanism may include a user identification number which is correlated to a location for providing information corresponding to a reprographic operation. In addition, the identification mechanism may serve as a security means to ensure the user is an authorized account holder for the reprographic device. The above described functions of an identification mechanism may be implemented in combination with or exclusively of one another. In another embodiment, the user may designate a voice mailbox or telephone number for receiving a confirmation as identification rather than using a particular identification mechanism.

Following a request for a reprographic operation, peripheral 30 may serve as a paper-user interface between the operator and the reprographic device. For example, if reprographic device 10 is a facsimile machine, peripheral 30 may scan the paper document and store it in electrical form in memory 26, whereas if the device is a printer the peripheral may convert a stored document in memory 26 to a paper document. Processor 28 may be used to convert a document between paper and electrical format.

In a preferred embodiment, reprographic device 10 may send a stored document to the desired destination using output unit 24. Output unit 24 also may transmit information reflecting job information and information identifying a location to provide information corresponding to the reprographic operation to server 14 over network 12. Output unit 24 may transmit information to server 14 over network 12 using, for example, a data modem.

In addition to receiving information from a user, input unit 22 may receive information regarding a reprographic operation from server 14. The received information from server 14 may include any relevant information regarding a reprographic operation such as status of the operation, success or failure of the operation, a telephone number to which the document was transmitted, document scan time, the number of pages processed, and the number of attempts the operation was attempted. For example, input unit 22 may receive information concerning a reprographic operation such as the destination to which a document was transmitted, the printer at which the document was subsequently printed, and the number of pages that were successfully printed by the printer. Processor 28 may also perform calculations based on a document stored in memory 26 and provide results to add to a confirmation message. For example, processor 28 may determine an identification number associated with the document from the document's cover sheet. It is apparent that a variety of complex information regarding an operation may be included in the status.

Figure 3:
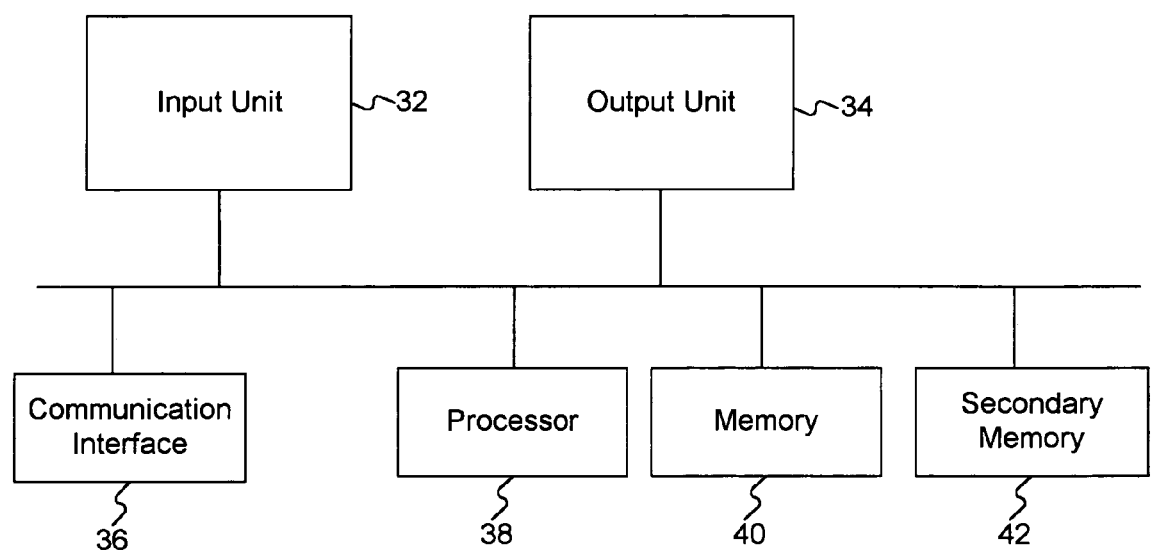
FIG. 3 is a schematic view of a server consistent with the present invention.

FIG. 3 illustrates a schematic diagram of server 14 including an input unit 32, an output unit 34, a communication interface 36, a processor 38, a memory 40, and a secondary memory 42. As described in part above and shown in FIG. 3, server 14 may receive the transmitted job information and destination information from reprographic device 10 at input unit 32. Using the received job information, such as a job identification number, server 14 may monitor the progress of a reprographic operation by receiving status information corresponding to the reprographic operation and transmitting the information as an audio message to a location identified for receiving information corresponding to the reprographic operation. In a preferred embodiment server 14 may determine the destination to transmit the information corresponding to a reprographic operation using processor 38 to correlate the received destination information with a database of possible destination locations stored in memory 40. For example, a user identification number may be received at input unit 32 and compared with a database of telephone numbers and user identification numbers to determine the telephone number to call with information about the reprographic operation. Alternatively, server 14 may receive a telephone number to provide information about the reprographic operation at input unit 32 and use memory 40 to store the number until it is time to be used.

After determining the telephone number to call, processor 38 generates an audio message reflecting information about the reprographic operation. Processor 38 then accesses communication interface 36 to transmit the reprographic information to the determined destination location. Communication interface 36 may be any device suitable for transmission of audio data, such as a modem. Communication interface 36 connects to telephone network 16.

In a preferred embodiment, secondary memory 42 of server 14 may be used to store a document being processed by a reprographic device before the process is complete. Upon receiving an audio message reflecting a status, or information about a reprographic operation that may include results of processing a document stored in secondary memory 42 of server 14, a user may decide to refer to the document through a remote interface such as a web page on computer 20 or a document token. For example, the user may retrieve the document or re-send the document based on the received status.

Figure 4:
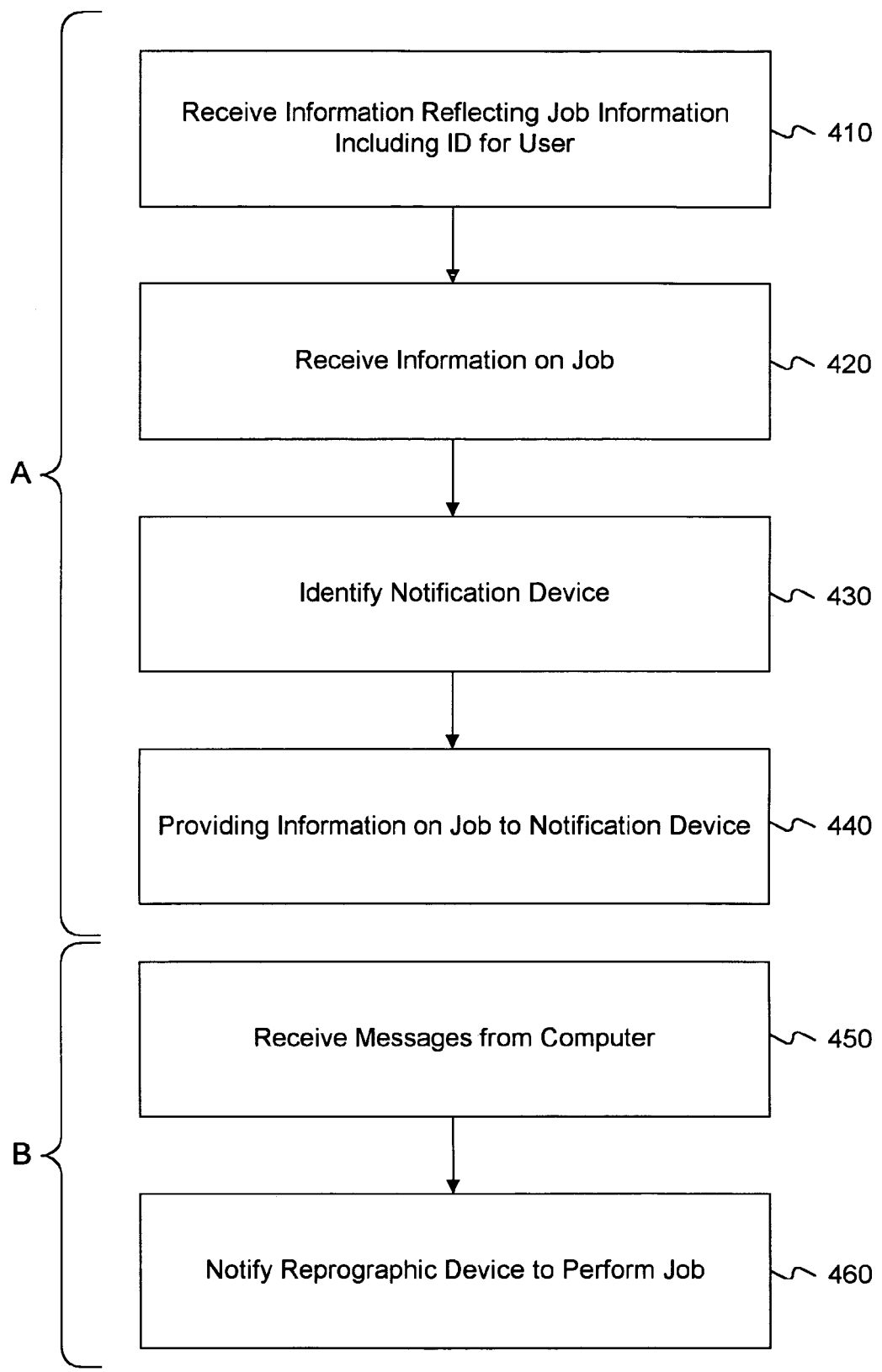
FIG. 4 is a flow diagram for a reprographic operations process consistent with the present invention.

FIG. 4 illustrates a flow diagram for the processes (A and B) performed by server 14. Server 14 first receives information reflecting job information from reprographic device 10, wherein the information includes an identification for the user (step 410). The information may be saved in memory 40 for later use. Server 14 receives information corresponding to the reprographic operation (step 420). This information may include status of the reprographic operation from the reprographic device 10. Other information may also be received including information about the success or failure of transmission, transmission destination, meta-information about the document and its destination, and the state of other operations performed. Processor 38 processes the identification information provided by the user to determine information associated with a notification device, such as a telephone number for a particular telephone (step 430). In a preferred identification, the processing may be done by first accessing a database of memory 40 to determine the notification device from the identification provided by the user. In another embodiment the user may enter the identification of a particular notification device as a user identification number. That is, processor 38 does not have to access memory 40 to determine the notification device. The server 14 provides information regarding a reprographic operation to a designated notification device (step 440). The server 14 provides this information by first converting the monitored information into an audio message using processor 38 and then transmitting the message to telephone network 16 via a communication interface such as a modem. From telephone network 16, the audio message is routed to a designated telephone number 18. Known techniques and devices may be employed to generate the audio message.

Once a user receives the audio message from the notification device, he may decide to refer to the original document. For example, the user may wish to re-send the fax remotely through a web page to the original recipient or to a new recipient, or the user may wish to obtain a copy of the transmitted document. The user may also be provided with an option to re-send the fax by simply providing an instruction by audio input or key selection on the input part of the telephone.

FIG. 4 illustrates the additional steps performed by server 14 when a user decides to refer to the original document processed by a reprographic device. Server 14 receives a message from either one of the computers 20 or telephones 18 requesting the stored document for a particular job (step 450). The request may include job information, such as the job to be performed, with unique identification corresponding to the stored document. Upon retrieving the stored document, server 14 may notify reprographic device 10 to perform a reprographic operation or it may perform the job itself (step 460). An example of a job to be performed by server 14 may be to transmit the stored document to the user, via a suitable means such as electronic mail. An example of an operation to be performed by reprographic device 10 may be to re-transmit the stored document to the original recipient.

It will be apparent to those skilled in the art that various modifications and variations can be made to disclosed embodiments of the present invention without departing from the scope or spirit of the invention. For example, in an alternative embodiment the functionality of server 14 may be combined with that of reprographic device 10. Rather than having a separate server, reprographic device 10 may perform the functionality of server 14 by monitoring a reprographic operation and transmitting an audio message to a telephone network reflecting the status of the operation. Aspects of systems and methods consistent with the present invention may involve computer-readable medium. For example, software for implementing the operations outlined in FIG. 4 may be stored in computer readable media. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method for monitoring reprographic operations, comprising:

receiving a request for a reprographic operation including location information identifying a location to provide operation information corresponding to the reprographic operation;

accepting an identification number;

associating the identification number with the location information;

receiving the operation information;

generating an audio message reflecting the operation information;

transmitting the audio message using the location information;

receiving, at a system used to monitor reprographic operations, a second request generated by an audio input or key selection when the completion information indicates that the reprographic operation was not successfully completed; and performing a requested function without additional input beyond the second request at the location associated with the location information.

2. The method of claim 1, wherein receiving a request for a reprographic operation comprises inputting a document for electronic transmission to a destination.

3. The method of claim 1, wherein receiving the operation information comprises providing information selected from a group comprising:

information regarding the success or failure of the reprographic operation;

information regarding the status of the reprographic operation;

destination information associated with the reprographic operation;

information about a state of other reprographic operations performed; and information corresponding to a document associated with the reprographic operation.

4. The method of claim 1, wherein transmitting the audio message using the location information includes signaling a pager associated with the location information.

5. The method of claim 1, further comprising:

storing the audio message at a remote device associated with the location information.

6. A method for providing information reflecting completion of reprographic operations, comprising:

receiving a request associated with a reprographic operation, including information identifying a remote data terminal;

receiving information reflecting a completion of the reprographic operation;

generating an audio message reflecting the completion information;

determining whether the completion information indicates that the reprographic operation was completed successfully;

transmitting the audio message to the remote data terminal;

receiving, at a system used to monitor reprographic operations, a second request generated by an audio input or key selection when the completion information indicates that the reprographic operation was not successfully completed; and performing a requested function without additional input beyond the second request at the location associated with the location information.

7. The method of claim 6, wherein the information identifying a remote data terminal is an identification number, and wherein the step of transmitting the audio message to the remote data terminal includes the substep of:

determining a code associated with the remote data terminal from the identification number.

8. The method of claim 6, wherein the step of transmitting the audio message includes the substep of:

initiating a call to the remote data terminal.

9. The method of claim 6, wherein the reprographic operation is a facsimile transmission, and wherein the step of receiving a request associated with the reprographic operation comprises:

inputting a document associated with the facsimile transmission; and inputting information identifying a location to which to transmit the document.

10. A reprographic system comprising:

a reprographic device capable of performing reprographic operations;

at least one remote data terminal electrically connectable to the reprographic device; and a computer comprising:

a memory having instructions for:

receiving a request associated with a reprographic operation to be performed by the reprographic device, including information identifying the remote data terminal, receiving information reflecting a completion of the reprographic operation, generating an audio message reflecting the completion information, transmitting the audio message to the remote data terminal;

receiving a second request generated by an audio input or key selection when the completion information indicates that the reprographic operation was not successfully completed; and performing a requested function without additional input beyond the second request at a remote data terminal; and a processor for executing the instructions.

11. A reprographic device connected to a network and capable of communicating with at least one remote data terminal, comprising:

a memory having instructions for:

receiving a request associated with a reprographic operation including information identifying the remote data terminal, receiving information reflecting a completion of the reprographic operation, generating an audio message reflecting the completion information, and transmitting the audio message to the remote data terminal;

receiving a second request generated by an audio input or key selection when the completion information indicates that the reprographic operation was not successfully completed; and performing a requested function without additional input beyond the second request at a remote data terminal; and a processor for executing the instructions.

12. A method for providing information on the status of facsimile transmissions, comprising:

receiving a request to perform a facsimile transmission, including information identifying a telephone;

receiving information reflecting a completion of the facsimile transmission;

transmitting an audio message corresponding to the completion information to the telephone;

receiving, at a system used to monitor facsimile transmissions, a second request generated by an audio input or key selection to perform the facsimile transmission when the completion information indicates that the facsimile transmission was not successfully completed; and performing the facsimile transmission without additional input beyond the second request at the location of the telephone.

13. The method of claim 12, wherein the information identifying the telephone is comprised of an identification number, and wherein transmitting an audio message comprises:

determining a telephone number associated with the telephone from the identification number.

14. The method of claim 13, wherein determining a telephone number comprises:

accessing a stored table comprising identification numbers and corresponding telephone numbers.

15. A method for providing information on the status of facsimile transmissions in a network including at least one facsimile machine, at least one telephone, and at least one remote user station, the method comprising the steps, performed by a server accessible to the network, of:

permitting the remote user station to provide instructions to the facsimile machine;

receiving a request for the facsimile machine to perform a facsimile transmission, including information identifying the telephone;

receiving information from the facsimile machine reflecting a completion of the facsimile transmission;

transmitting an audio message corresponding to the completion information to the telephone;

receiving a second request generated by an audio input or key selection at the remote user station to perform the facsimile transmission when the completion information indicates that the facsimile transmission was not successfully completed; and performing the facsimile transmission without additional input beyond the second request at the remote user station.

16. The method of claim 15, wherein the step of receiving a request for the facsimile machine to perform a facsimile transmission comprises:

inputting a document associated with the facsimile transmission; and inputting information identifying a location to which to transmit the document.

\* \* \* \* \*